July 28, 1931.  W. J. FOUSE  1,816,252
INDICATOR FOR COTTON PRESSES
Filed Feb. 21, 1931  2 Sheets-Sheet 2
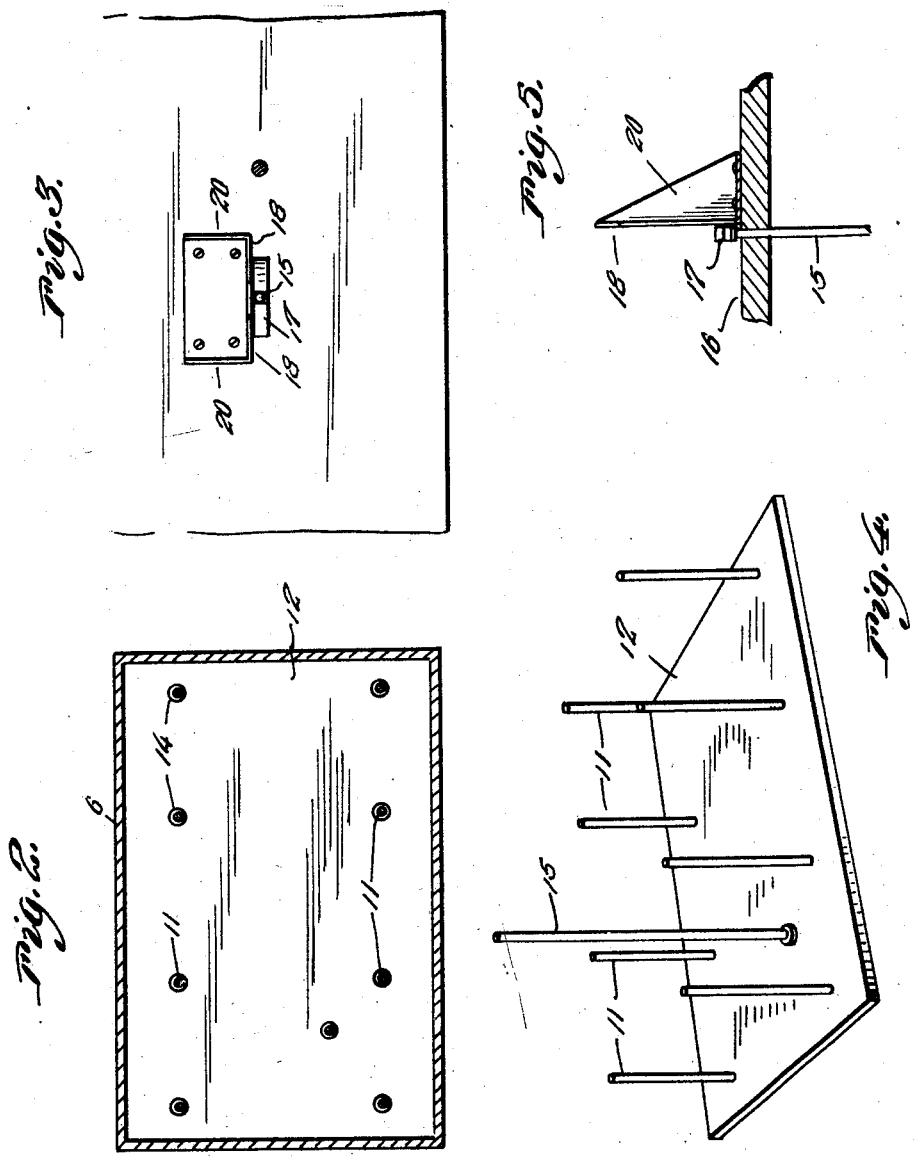
Inventor
William J. Fouse
By Clarence A. O'Brien
Attorney Patented July 28, 1931

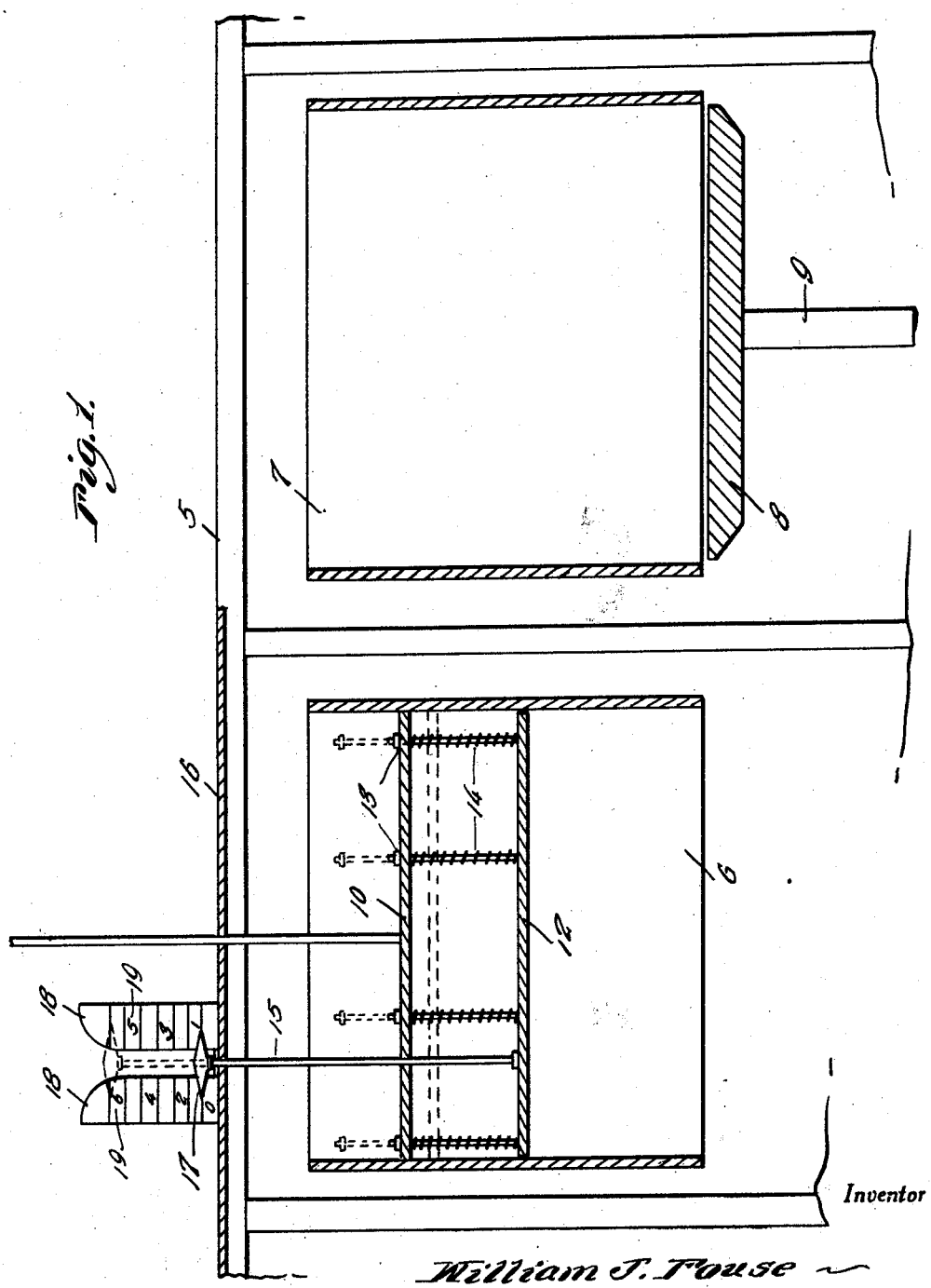

1,816,252

UNITED STATES PATENT OFFICE

WILLIAM JEFFERSON FOUSE, OF AUSTWELL, TEXAS

INDICATOR FOR COTTON PRESSES

Application filed February 21, 1931. Serial No. 517,573.

This invention relates to improvements in cotton presses, and the principal object thereof is to provide an indicator for cotton presses whereby the approximate weight of the bale can be readily ascertained.

During the following specification and claim, other important objects and advantages of the invention will become apparent.

In the drawings:—

Figure 1 represents a vertical sectional view through a double box cotton press, showing the invention.

Fig. 2 represents a horizontal sectional view through the invention, and associated press box.

Fig. 3 represents a fragmentary top plan view of the indicator.

Fig. 4 represents a perspective view of the movable follower plate of the indicator.

Fig. 5 represents a fragmentary detailed sectional view showing the indicator.

Referring to the drawings wherein like numerals designate like parts, it can be seen that numeral 5 denotes a press frame for a double box type of cotton press. Numerals 6 and 7 represent the boxes in which the cotton is bailed. Numeral 8 represents a presser head operated by the hydraulic ram rod 9.

In carrying out the present invention it can be seen in Fig. 1, that a plate 10 is stationarily fixed in the box 6, and has openings therein to receive the upstanding pins 11 on the follower plate 12. The upper ends of the pins 11 are provided with nuts 13 which limit the downward movement of the follower plate 12. Convoluted on the pins 11 are the springs 14, interposed between the plates 10 and 12 to normally maintain the plate 12 in the position shown in Fig. 1.

Numeral 15 represents an elongated rod which extends upwardly from the plate 12 thru an opening in the plate 10 and also through an opening in the flooring top 16. The upper end of this rod 15 is provided with a double pointer 17, complementary to the upstanding plate 18—18, which bears indicating data 19. The plates 18—18 are provided with flanges 20 for bracing the same in the upright position shown in Fig. 5.

It can now be seen, that when the cotton is being pressed against the follower 12, reaches a certain compressed bulk, its quantity will be registered on the indicator by the relative position of the pointer 17 with respect to the characters 19 on the scales 18.

In this manner, the approximate weight of the bale being formed can be readily ascertained.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

In a cotton press including the box in which the cotton is baled, a stationary plate in the upper part of said box, a follower plate located below the first plate, rods having their lower ends connected with the follower plate passing through holes in the first plate, springs on the rods arranged between the plates, a long rod connected with the follower plate and passing through a hole in the first plate and having a pointer at its upper end and a scale-carrying member over the scale of which the pointer moves as the follower plate is pressed upwardly by the cotton being bailed.

In testimony whereof I affix my signature.

WILLIAM JEFFERSON FOUSE.